(12) United States Patent
Su

(10) Patent No.: US 7,639,057 B1
(45) Date of Patent: Dec. 29, 2009

(54) CLOCK GATER SYSTEM

(75) Inventor: Jason T. Su, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 17 days.

(21) Appl. No.: 11/949,424

(22) Filed: Dec. 3, 2007

Related U.S. Application Data

(60) Provisional application No. 60/869,029, filed on Dec. 7, 2006.

(51) Int. Cl.
*G06F 1/04* (2006.01)
*H03K 3/00* (2006.01)

(52) U.S. Cl. .................... 327/291; 326/93; 326/96; 326/97

(58) Field of Classification Search ............ 327/165, 327/166, 291, 374, 178, 199; 326/93–98; 716/6
See application file for complete search history.

(56) References Cited

U.S. PATENT DOCUMENTS 5,661,675 A * 8/1997 Chin et al. .................. 708/670
6,232,820 B1 5/2001 Long et al.
6,377,078 B1 * 4/2002 Madland ...................... 326/95
6,429,698 B1 8/2002 Young
6,469,953 B1 * 10/2002 Hong ..................... 365/230.08
6,809,570 B2 10/2004 Francom
7,131,092 B2 10/2006 Ham
2004/0257115 A1 * 12/2004 Bertram et al. .............. 326/98
2007/0210833 A1 9/2007 Hamdan et al.

OTHER PUBLICATIONS

Wikipedia—Inverter (Logic Gate) http://en.wikipedia.org/wiki/Inverter_(logic_gate).*

* cited by examiner

*Primary Examiner*—Lincoln Donovan
*Assistant Examiner*—Brandon S Cole

(57) ABSTRACT

A clock gater includes a first logic circuit that receives an enable signal and that includes first and second subcircuits. The clock gater also includes a latch that shares first and second nodes with the first logic circuit and that includes third and fourth subcircuits. The first logic circuit and the latch receive a clock signal that varies between first and second clock states. The first and third subcircuits pull the first and second nodes, respectively, to a common precharge voltage based on the first clock state in order to pass the clock signal. The second and fourth subcircuits pull the first and second nodes, respectively, to complementary voltages based on the second clock state to pass the clock signal. The first node passes the clock signal or gates the clock signal based on the enable signal.

38 Claims, 9 Drawing Sheets

CLOCK GATER SYSTEM

CROSS-REFERENCE TO RELATED APPLICATIONS

This application claims the benefit of U.S. Provisional Application No. 60/869,029, filed on Dec. 7, 2006. The disclosure of the above application is incorporated herein by reference in its entirety.

FIELD

The present disclosure relates to integrated circuits (ICs) and more particularly to clock gater systems for ICs.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Integrated circuits ("ICs") of a synchronized digital system (SDS) may include clocking systems that distribute clock signals to various circuits on or off the ICs. Clocked circuits respond to the assertion (or deassertion) of a clock signal. An IC may use clock gaters to inhibit operation of one or more clocked circuits for a predetermined number of clock cycles while the remainder of the IC continues to function.

Clock gaters can function as simple on/off switches that control whether or not a clock signal is received in the clocked circuit, thereby controlling whether or not the circuit operates. Clock gaters may buffer clock signals in response to assertion (or deassertion) of an enable signal and pass the clock signal in response to deassertion (or assertion) of the enable signal.

Referring now to FIG. 1, a clock source 10 of an IC system 12 provides clock signals to system devices, such as power-consuming circuits 14-1, 14-2, ..., and 14-N (collectively referred to as power-consuming circuits 14). Exemplary power consuming circuits include dynamic logic circuits used to read and write data to memory. The clock source 10 also provides clock signals to power-consuming circuits 16-1, 16-2, ..., and 16-M (collectively referred to as power-consuming circuits 16). Power-consuming circuits 14 may receive the clock signals via buffers 18, 20, whereas power-consuming circuits 16 may receive the clock signals via a buffer 22 and a clock gater 24.

The clock gater 24 may be selectively controlled (for example, enabled, disabled and/or run at low power) by enable signals (E) and test enable signals (TE) from a power management module 25. For example, the power management module 25 may determine that one or more of the power-consuming circuits 16 does not require a clock signal. The power management module 25 may enable the clock gater 24, which then may provide a constant low signal to the power-consuming circuits 16 instead of the clock signal.

The clock gater 24 may include one or more logic circuits. The logic circuits, which are also referred to as logic gates, may include inverters, AND gates, NAND gates, OR gates, NOR gates, etc. The logic circuits may be static or dynamic. Outputs of static logic circuits are logical functions of the inputs. In contrast, a control signal, such as a clock signal, may control outputs of dynamic logic circuits so that the outputs are not necessarily functions of the inputs.

The logic circuits may include combinations of, for example, complementary metal oxide semiconductor (CMOS) circuits. CMOS circuits may include n- and p-channel transistors (referred to as n- and p-type transistors) that include source, drain, and gate terminals, also referred to as first, second, and control terminals, respectively. Other types of transistors may also be used.

The n- and p-type transistors may act as switches that are either open or closed. Sources and drains of n- and p-type transistors communicate when the devices are closed and do not communicate when the devices are open. An n-type transistor is open when the gate is at a logical 0, and closed when the gate is at a logical 1. A p-type transistor is closed when the gate is at a logical 0, and open when the gate is at a logical 1. A logical 1 may be represented by a supply voltage potential Vdd, and a logical 0 may be represented by a reference voltage potential Vss, such as ground.

Referring now to FIGS. 2A and 2B, an exemplary clock gater 24 is illustrated. The clock gater 24 may include an OR gate 50 that receives an enable signal and/or a test enable signal. The enable signal (E) may enable/disable a clock signal (CLK) to a circuit that is not under test, and the test enable signal (TE) may enable/disable a clock signal to a circuit under test. A latch 52 of the clock gater 24 may buffer the clock signal based on outputs of the OR gate 50. For example, if either the enable or test enable signals provide a logical 1 to the OR gate 50, the latch 52 buffers the clock signal in a feedback circuit 53, otherwise, the latch 52 passes the clock signal.

A NAND gate 54 may output an inverted clock signal based on the clock signal and outputs of the latch 52. An inverter 56 may provide the output clock signal (QCK) by inverting NAND gate outputs. The output clock signal is distributed to a clock-gated circuit. The output clock signal is therefore delayed by at least four logic stages (OR gate 50, latch 52, NAND gate 54, and inverter 56).

In FIG. 2B, the OR gate 50 may include n- and p-type transistors 60, 62, 64, 66 and inverter 68 that collectively provide a logical 1 when either the enable or test enable signals are high. The latch 52 includes n- and p-type transistors 70-81 of a feedback circuit 53 that selectively provide the clock signal output based on the enable signal. The NAND gate 54 includes n- and p-type transistors 90-93 that provide an output based on the buffered clock signal from the latch 52 and the current clock signal. The inverter 56 may include n- and p-type transistors 96-97 to invert NAND gate signals.

The latch output and clock signal that are supplied to the respective inputs of the NAND gate 54 may be in a race condition in which the clock signal waits until the latch output arrives. If the latch output arrives later than the clock signal, then the output clock signal will be driven by the enable signal and not by the clock signal, which can result in a clock skew problem. To allow enough time to provide the latch output before the clock signal, the setup time of the enable signal with respect to the clock signal may be increased. In other words, the clock signal and/or the latch output are effectively delayed through the addition of setup operations in the latch 52 and/or OR gate 50 so that both are received in the NAND gate 54 simultaneously.

SUMMARY

A clock gater includes a first logic circuit that receives an enable signal and that includes first and second subcircuits. The clock gater also includes a latch that shares first and second nodes with the first logic circuit and that includes third and fourth subcircuits. The first logic circuit and the latch receive a clock signal that varies between first and second clock states. The first and third subcircuits pull the first and second nodes, respectively, to a common precharge voltage based on the first clock state in order to pass the clock signal. The second and fourth subcircuits pull the first and second nodes, respectively, to complementary voltages based on the second clock state to pass the clock signal. The first node passes the clock signal or gates the clock signal based on the enable signal.

In other features, the first logic circuit includes a dynamic logic gate that includes the first and second subcircuits. The first logic circuit receives a test enable signal. The first node passes the clock signal and gates the clock signal based on the test enable signal. The first, second, third, and fourth subcircuits include at least one of n- and p-type transistors. The latch includes an inverter subcircuit, and the first node passes and gates the clock signal via the inverter subcircuit. The inverter subcircuit includes complimentary n- and p-type transistors that communicate with a reference voltage and a source voltage respectively. The latch includes a dynamic logic gate subcircuit that includes the third and fourth subcircuits. The third and fourth subcircuits comprise complimentary p- and n-type transistors, respectively, that communicate with a source voltage and a reference voltage, respectively.

In other features, the clock gater includes a keeper subcircuit that pulls the first node to a source voltage based on a voltage of the second node. The keeper subcircuit includes a p-type transistor that includes a first terminal that communicates with the source voltage, a second terminal that communicates with the first node and a control terminal that communicates with the second node. The voltage of the second node corresponds to a threshold voltage of the control terminal.

In other features, the clock gater includes a feedback subcircuit that pulls the second node to a first voltage based on the first node at a second voltage and the first clock state. The feedback subcircuit includes an inverter and an n-type transistor. The n-type transistor includes a first terminal that communicates with the first node, a second terminal that communicates with a reference voltage, and a control terminal that receives an inverted voltage of the first node via the inverter. An integrated circuit (IC) includes the clock gater and further includes a clock source that provides the clock signal.

In other features, a method for operating a clock gater includes receiving an enable signal in a first logic circuit and sharing first and second nodes between the first logic circuit and a latch. The method also includes receiving a clock signal that varies between first and second clock states in the first logic circuit and the latch. The method also includes pulling the first and second nodes, respectively, to a common precharge voltage based on the first clock state to pass the clock signal. The method also includes pulling the first and second nodes, respectively, to complementary voltages based on the second clock state to pass the clock signal. The method also includes passing and gating the clock signal based on the enable signal.

In other features, the first logic circuit includes one a dynamic logic gate. The method also includes receiving a test enable signal. The method also includes passing the clock signal in response to the test enable signal. The method also includes receiving a test enable signal and controlling the first logic circuit and gating the clock signal in response to the test enable signal.

In other features, the first and second logic circuits include at least one of n- and p-type transistors. The method also includes passing and gating the clock signal via an inverter subcircuit of the latch. The method also includes connecting a reference voltage and a source voltage respectively to complimentary n- and p-type transistors of the inverter subcircuit. The latch includes a dynamic logic gate subcircuit that includes third and fourth subcircuits. The method also includes connecting complimentary p- and n-type transistors of the third and fourth subcircuits to a source voltage and a reference voltage, respectively.

In other features, the method includes pulling the first node to a source voltage based on a voltage of the second node. The method also includes pulling the second node to a first voltage based on the first node at a second voltage and the first clock state. The method also includes pulling the second node through a feedback subcircuit. The feedback subcircuit includes an inverter and an n-type transistor that includes a first terminal communicating with the first node, a second terminal communicating with a reference voltage, and a control terminal receiving an inverted voltage of the first node via the inverter.

In other features, a clock gater includes first logic means for receiving an enable signal. The first logic means includes first and second submeans for responding to a clock signal. The clock gater also includes latch means for sharing first and second nodes with the first logic means. The latch means includes third and fourth submeans for responding to the clock signal. The first logic means and the latch means receive the clock signal, which varies between first and second clock states. The first and third submeans pull the first and second nodes, respectively, to a common precharge voltage based on the first clock state to pass the clock signal. The second and fourth submeans pull the first and second nodes, respectively, to complementary voltages based on the second clock state to pass the clock signal.

In other features, the first node passes the clock signal and gates the clock signal based on the enable signal. The first logic means includes a dynamic logic gate that includes the first and second submeans. The first logic means receives a test enable signal. The first node passes the clock signal and gates the clock signal based on the test enable signal. The first, second, third, and fourth submeans comprise at least one of n- and p-type transistors. The latch means includes inverter submeans for inverting. The first node passes and gates the clock signal via the inverter submeans. The inverter submeans includes complimentary n- and p-type transistor means for communicating with a reference voltage and a source voltage respectively.

In other features, the latch means includes a dynamic logic gate that includes the third and fourth submeans. The third and fourth submeans include complimentary p- and n-type transistor means, respectively, for communicating with a source voltage and a reference voltage, respectively. The clock gater also includes keeper submeans for pulling the first node to a source voltage based on a voltage of the second node. The keeper submeans includes p-type transistor means for switching that includes first terminal means for communicating with the source voltage. The p-type transistor means also includes second terminal means for communicating with the first node and control terminal means for communicating with the second node.

In other features, the voltage of the second node corresponds to a threshold voltage of the control means. The clock gater also includes feedback submeans for pulling the second node to a first voltage based on the first node at a second voltage and the first clock state. The feedback submeans includes inverter means for inverting and n-type transistor means for switching that includes first terminal means for communicating with the first node, second terminal means for communicating with a reference voltage. The n-type transistor means also includes control terminal means for receiving an inverted voltage of the first node via the inverter means. An integrated circuit (IC) includes the clock gater and further includes clock means for providing the clock signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
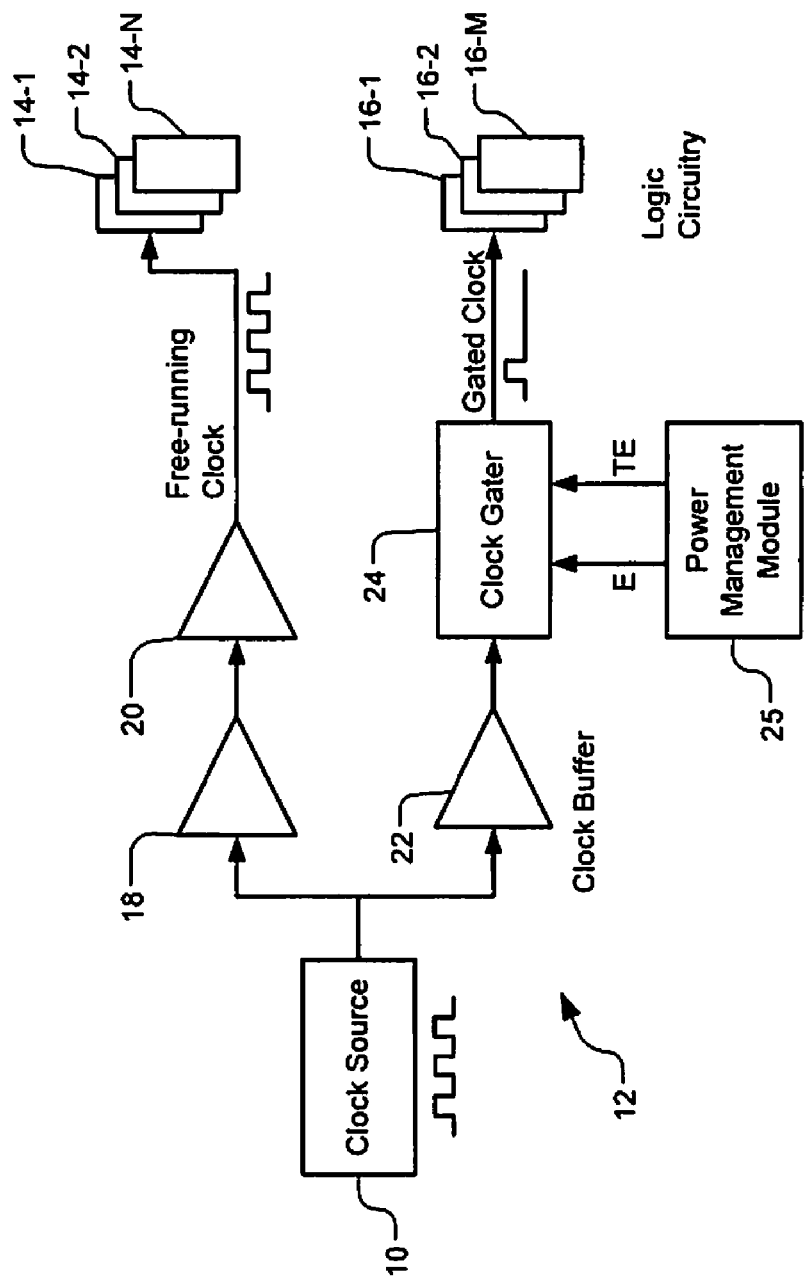
FIG. 1 is a clock gater system according to the prior art.
Figure 2A:
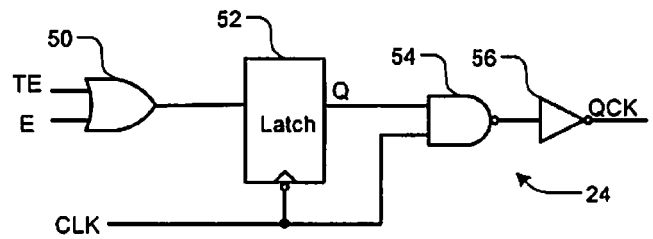
FIG. 2A is a clock gater according to the prior art.
Figure 2B:
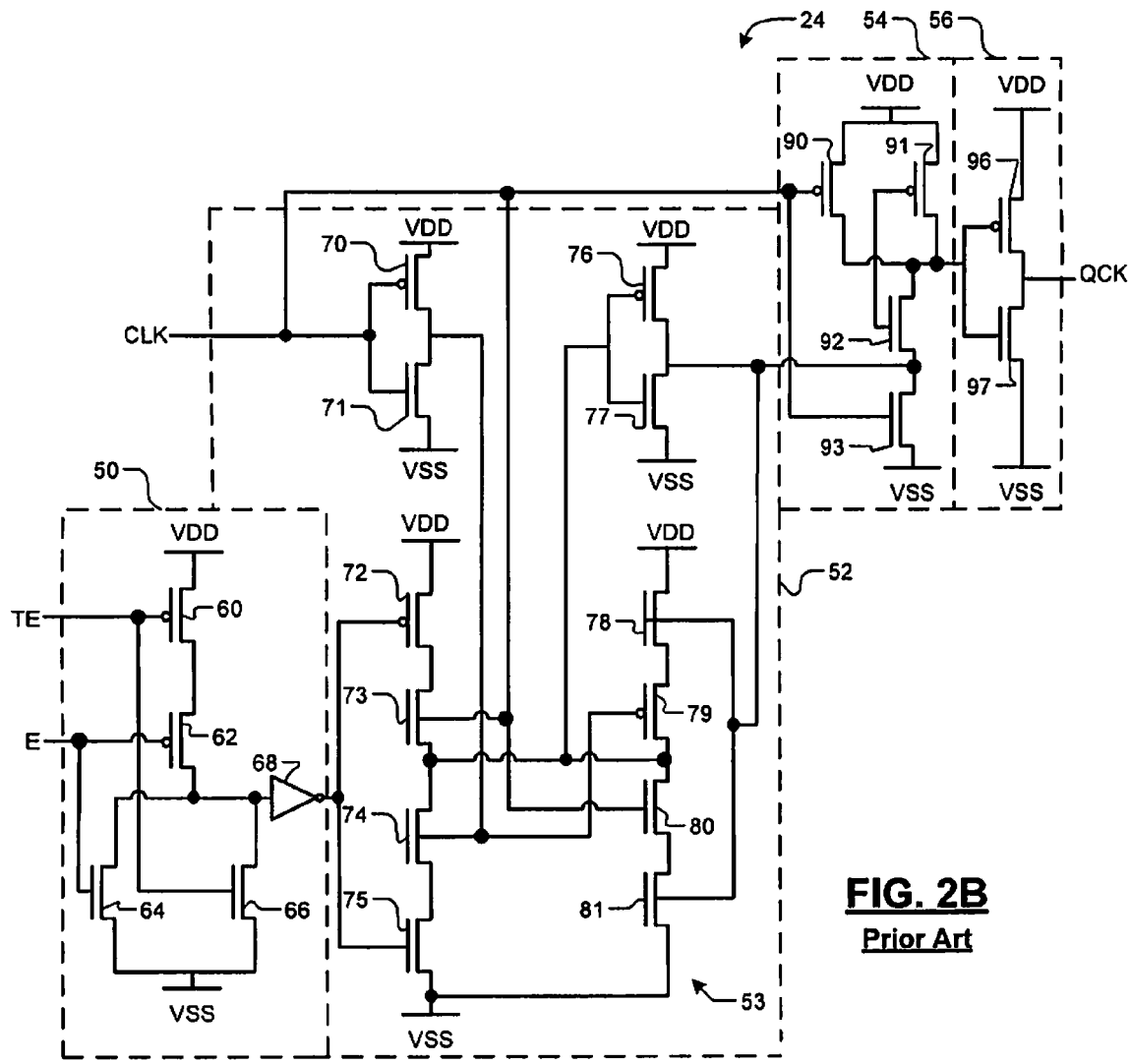
FIG. 2B is a clock gater according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The present disclosure is directed to substantially minimizing setup time for a clock gater while also substantially minimizing required surface area for the clock gater. The clock gater may include one or more logic circuits. The logic circuits, which are also referred to as logic gates, may be inverters, AND gates, NAND gates, OR gates, NOR gates, etc. The logic circuits may be static or dynamic and may include combinations of, for example, complementary metal oxide semiconductor (CMOS) circuits. CMOS circuits may include n- and p-channel transistors (referred to as n- and p-type transistors) that include source, drain, and gate terminals, also referred to as first, second, and control terminals, respectively. Other types of transistors may also be used.

Figure 3A:
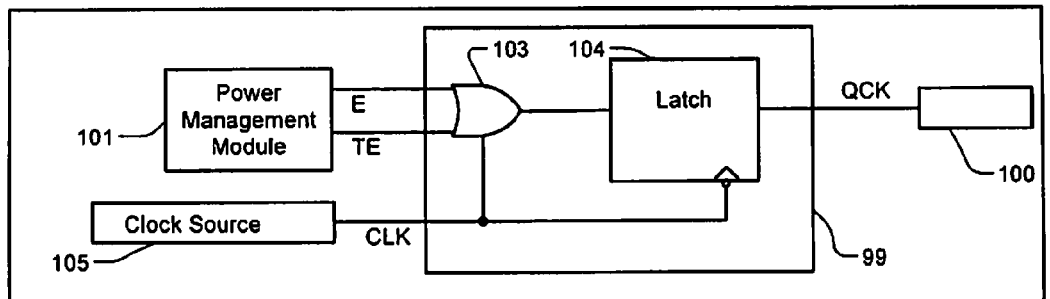
FIG. 3A is a clocked system according to the present disclosure.
Figure 3B:
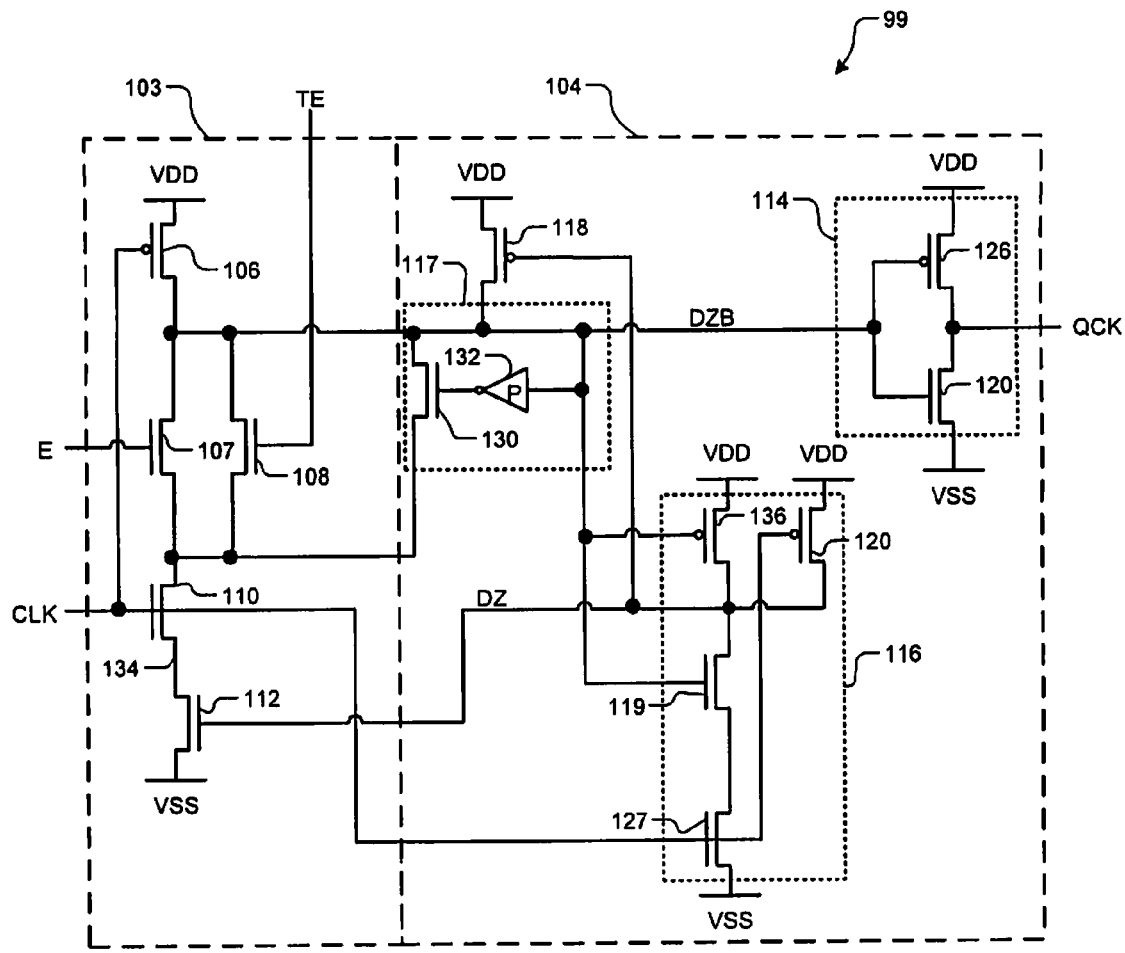
FIG. 3B is a clock gater according to the present disclosure.

Referring now to FIGS. 3A and 3B, a clocked system 98 includes a clock gater 99 that selectively passes a clock signal (CLK) to a system device 100. The clocked system 98 may be included on one or more ICs, and the system device 100 may be any device that receives the clock signal.

The clock gater 99 includes a dynamic logic gate 103 (logic circuit) and a latch 104. The latch 104 receives outputs of the dynamic logic gate 103 and a clock signal from a clock source 105. The clock signal may oscillate between a logical 1 (herein also referred to as 1) and a logical 0 (herein also referred to as 0). A logical 1 may be represented by a supply voltage potential Vdd, and a logical 0 may be represented by a reference voltage potential Vss, such as ground.

The dynamic logic gate 103 is illustrated as a single dynamic OR gate that is controlled in response to the clock signal and enable (E) and/or test enable (TE) signals from enable and test enable signal sources respectively. The enable and test enable signal sources may be submodules of a power management system 101 and might not be included on the same IC as the clock gater 99. Various other logic gates and/or combinations of logic gates may also be used to provide the functionality of the dynamic logic gate 103. The dynamic logic gate may include n- and p-type transistors 106, 107, 108, 110, 112.

The latch 104 and the dynamic logic gate 103 share nodes DZ and DZ-bar (DZB). The latch 104 may include an inverter subcircuit 114 that functions as an inverter and a logic gate subcircuit 116 that functions as a logic gate. The latch 104 may also include a feedback subcircuit 117 that provides feedback between nodes DZ, DZB and a keeper subcircuit 118 that selectively maintains DZB at the source voltage. The inverter subcircuit 114 may include n- and p-type transistors 120, 126. The logic gate subcircuit 116 may correspond to a dynamic NAND or dynamic AND gate and may include n- and p-type transistors 119, 120, 127, 136. The feedback subcircuit 117 may include an n-type transistor 130 and an inverter 132. Transistors 106, 110, 120, and 127 may be referred to herein as first, second, third, and fourth subcircuits respectively.

DZ and DZB may be controlled through first (precharge) and second (evaluation) stages. The clock signal may be at 0 in the precharge stage and 1 for the evaluation stage. In the precharge stage, the output of the latch 104 is driven high (or low) regardless of the value of the enable signal. For example, the nodes DZB, DZ are simultaneously strobed by the rising edge (or falling edge) of the clock signal and brought to a logical 1. The rising edge may correspond to a logical 1, and the falling edge may correspond to a logical 0.

The precharge stage is initiated when the enable signal is set to 1 and the clock is at 0. During the precharge stage both DZ and DZB may be charged to Vdd. When the clock cycles to 1, the evaluation stage is initiated. During the evaluation stage, one of DZ and DZB may be charge to Vdd and the other may be pulled to Vss. In other words, DZ and DZB may be complementary. If, however, the enable signal is not 1 or is switched to 0, then DZB remains precharged, and the clock signal is gated (i.e. the clock signal does not rise to 1), and the output of the latch 104 remains constant.

For example, the precharge stage may begin when the enable signal and/or the test enable signal is set to a logical 1 and the clock signal is at a logical 0. The dynamic NOR gate 103 includes p-type transistor that is switched on when the clock is 0 and an n-type transistor 107 that is switched on when the enable signal is 1. Alternatively, n-type transistor 108 is switched on when the test enable signal is 1. Resultantly, DZB is brought to Vdd. DZB then switches on n-type transistor 119. Further, p-type transistor is switched on to pull DZ to Vdd. When DZB is at Vdd, n-type transistor 120 brings an output of the latch 104 to Vss. The clock gater 99 thus outputs a signal that corresponds to Vss.

Further, when DZ is at Vdd, transistor 112 is switched on. If the enable signal is switched to 0, then DZB may not discharge and may remain at Vdd regardless of the clock signal, thus resulting in a constant Vss signal from the clock gater 99.

The evaluation stage follows the precharge stage when the enable signal is 1 and the clock rises to 1. In the evaluation stage, DZB may remain at Vdd or be discharged to Vss based on the enable signal. When the clock signal rises, n-type transistor 110 is switched on, and because transistors 107 and 112 are also on, DZB is pulled to Vdd. P-type transistor 126 is switched on, and the latch 104 outputs a signal that corresponds to Vdd. In turn, DZB dictates the logic state of DZ. That is, the clock signal switches n-type transistor 127 on, and because n-type transistor 119 is also on due to DZB, DZ is pulled to Vss.

When DZB discharges, feedback n-type transistor 130 is switched on via inverter 132 to connect DZB to input node 134. Also, p-type transistor 136 that is controlled by DZB is switched on to bring DZ to Vdd.

When the clock goes to 0 (and the enable signal is still 1), DZB is pulled to Vdd via p-type transistor 106, and DZ is pulled to Vss via n-type transistors 119, 127. When DZ is pulled to Vss, the keeper subcircuit 118, which may include a p-type transistor, is switched on to pull DZB to Vdd. The keeper subcircuit 118 is shut off when the evaluation begins and when both DZ and DZB are precharged to Vdd. Therefore, the keeper subcircuit 118 does not fight for control of DZB with the feedback inverter 132.

The rising edge of the clock signal discharges DZB to Vss, which in turn pulls DZ to Vdd. The feedback subcircuit 117 is then turned on by inverter 132 to provide a path from DZB to Vss. Thereafter, the enable signal may be set to 0 but the state of DZB and DZ may remain constant. When the clock signal cycles, DZB remains at VDD but allows DZ to discharge to Vss. Discharging DZ shuts off the n-type transistor 112 and turns on the keeper subcircuit 118 to hold DZB at Vdd. Resultantly, the enable signal may change states without affecting the state of the output of the latch 104.

Figure 4:
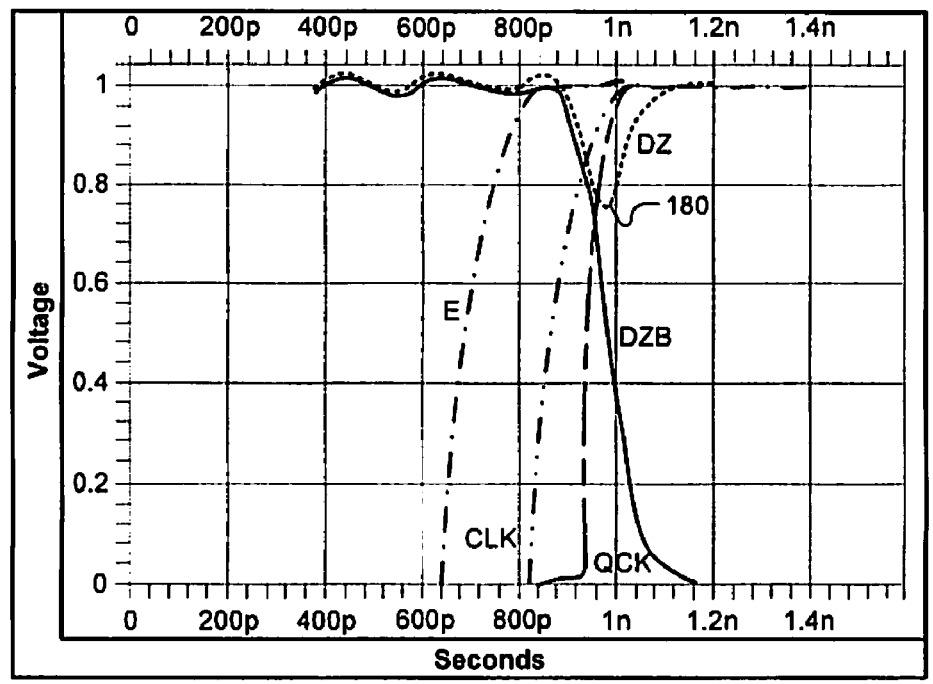
FIG. 4 is a timing diagram for a clock gater.

Referring now to FIG. 4, signal waveforms for the clock gater 99 are illustrated. In operation, the enable signal may arrive before or at the rise of the clock signal. DZB discharges as the clock goes to 1. DZ begins to discharge (to voltage level 180) as the clock is rising but then rises again based on DZB being pulled to Vss. The latch output (QCK) rises as DZB discharges and DZ is pulled to Vdd.

Figure 5:
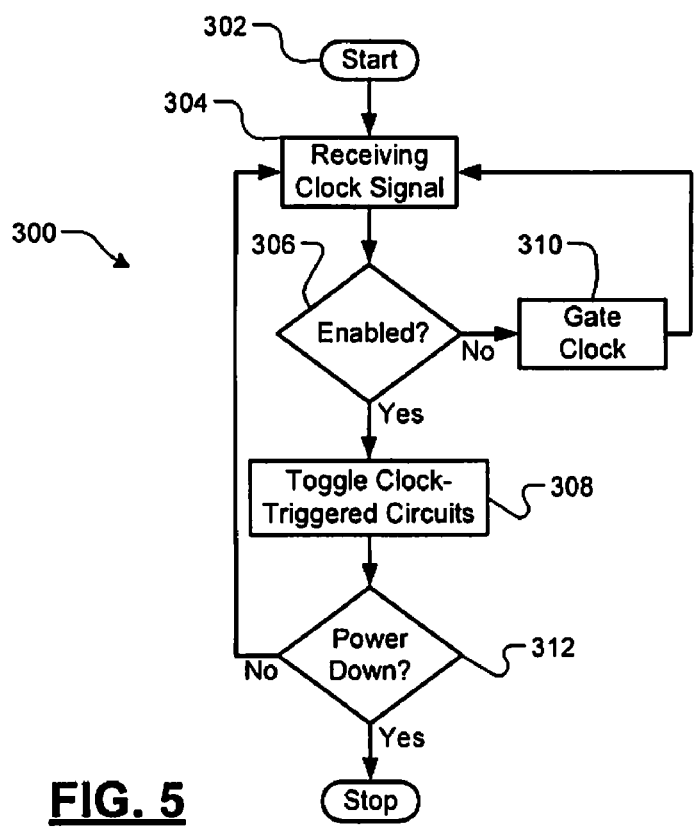
FIG. 5 illustrates a method for operating a clock gater.

Referring now to FIG. 5, a method 300 for operating a system that includes a clock gater is illustrated. Control starts in step 302. In step 304, the clock signal is received in the clock gater 99. If the enable signal is not permitting the clock signal to pass in step 306, the latch 104 gates the clock signal in step 310, and control returns to step 304. Otherwise, clock triggering circuits of the latch 104 are toggled in step 308 to pass the clock signal. In step 312, if the clock gater 99 has not been instructed to power down, control returns to step 304.

Referring now to FIGS. 6A-6G, various exemplary implementations incorporating the teachings of the present disclosure are shown.

Figure 6A:
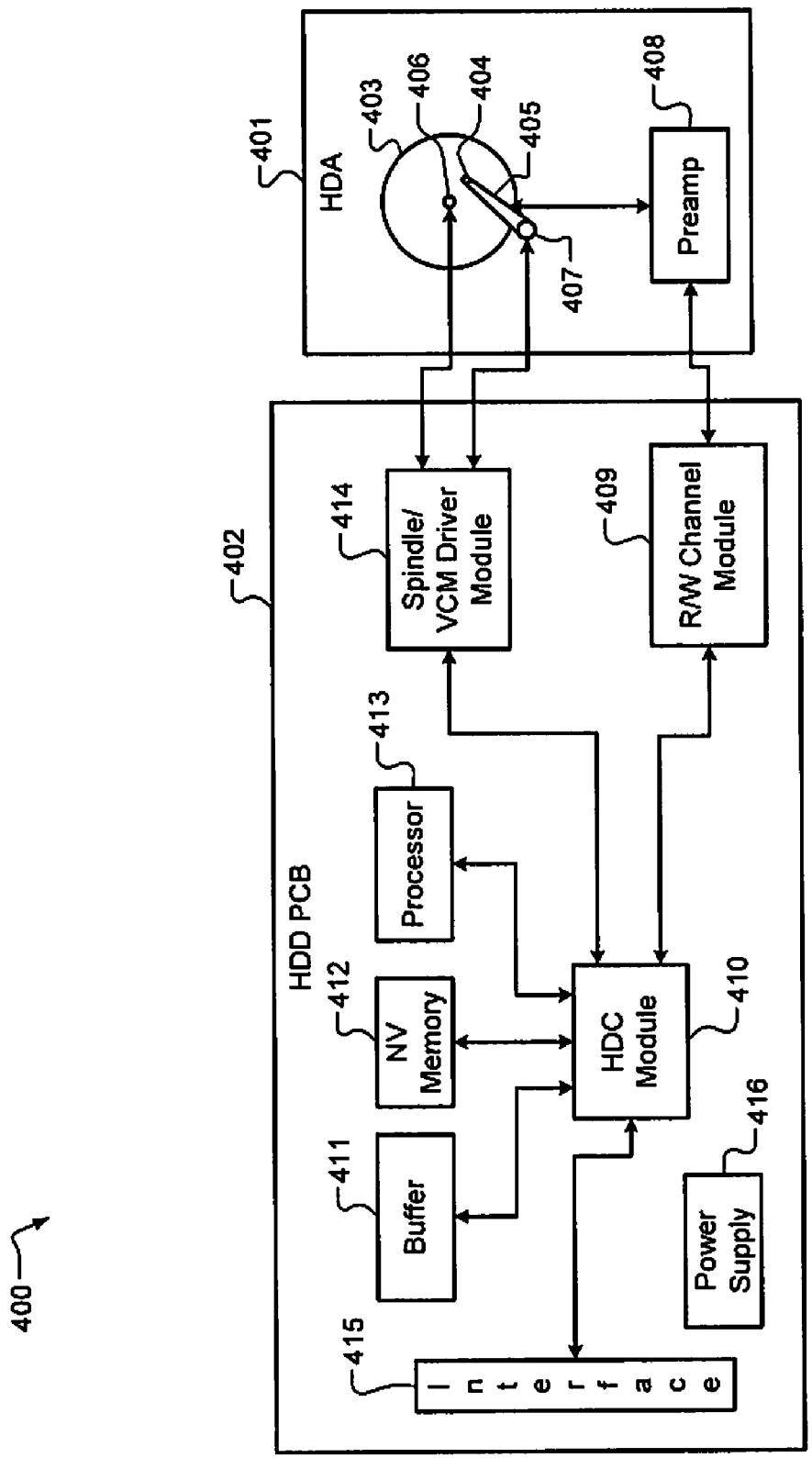
FIG. 6A is a functional block diagram of a hard disk drive.

Referring now to FIG. 6A, the teachings of the disclosure can be implemented in a hard disk controller (HDC) module to selectively control clocking operations for any or all dynamic logic based components of a hard disk drive (HDD) 400. The HDD 400 includes a hard disk assembly (HDA) 401 and an HDD printed circuit board (PCB) 402. The HDA 401 may include a magnetic medium 403, such as one or more platters that store data, and a read/write device 404. The read/write device 404 may be arranged on an actuator arm 405 and may read and write data on the magnetic medium 403. Additionally, the HDA 401 includes a spindle motor 406 that rotates the magnetic medium 403 and a voice-coil motor (VCM) 407 that actuates the actuator arm 405. A preamplifier device 408 amplifies signals generated by the read/write device 404 during read operations and provides signals to the read/write device 404 during write operations.

The HDD PCB 402 includes a read/write channel module (hereinafter, "read channel") 409, the HDC module 410, a buffer 411, nonvolatile memory 412, a processor 413, and a spindle/VCM driver module 414. The read channel 409 processes data received from and transmitted to the preamplifier device 408. The HDC module 410 controls components of the HDA 401 and communicates with an external device (not shown) via an I/O interface 415. The external device may include a computer, a multimedia device, a mobile computing device, etc. The I/O interface 415 may include wireline and/or wireless communication links.

The HDC module 410 may receive data from the HDA 401, the read channel 409, the buffer 411, nonvolatile memory 412, the processor 413, the spindle/VCM driver module 414, and/or the I/O interface 415. The processor 413 may process the data, including encoding, decoding, filtering, and/or formatting. The processed data may be output to the HDA 401, the read channel 409, the buffer 411, nonvolatile memory 412, the processor 413, the spindle/VCM driver module 414, and/or the I/O interface 415.

The HDC module 410 may use the buffer 411 and/or nonvolatile memory 412 to store data related to the control and operation of the HDD 400. The buffer 411 may include DRAM, SDRAM, etc. Nonvolatile memory 412 may include any suitable type of semiconductor or solid-state memory, such as flash memory (including NAND and NOR flash memory), phase change memory, magnetic RAM, and multi-state memory, in which each memory cell has more than two states. The spindle/VCM driver module 414 controls the spindle motor 406 and the VCM 407. The HDD PCB 402 includes a power supply 416 that provides power to the components of the HDD 400.

Figure 6B:
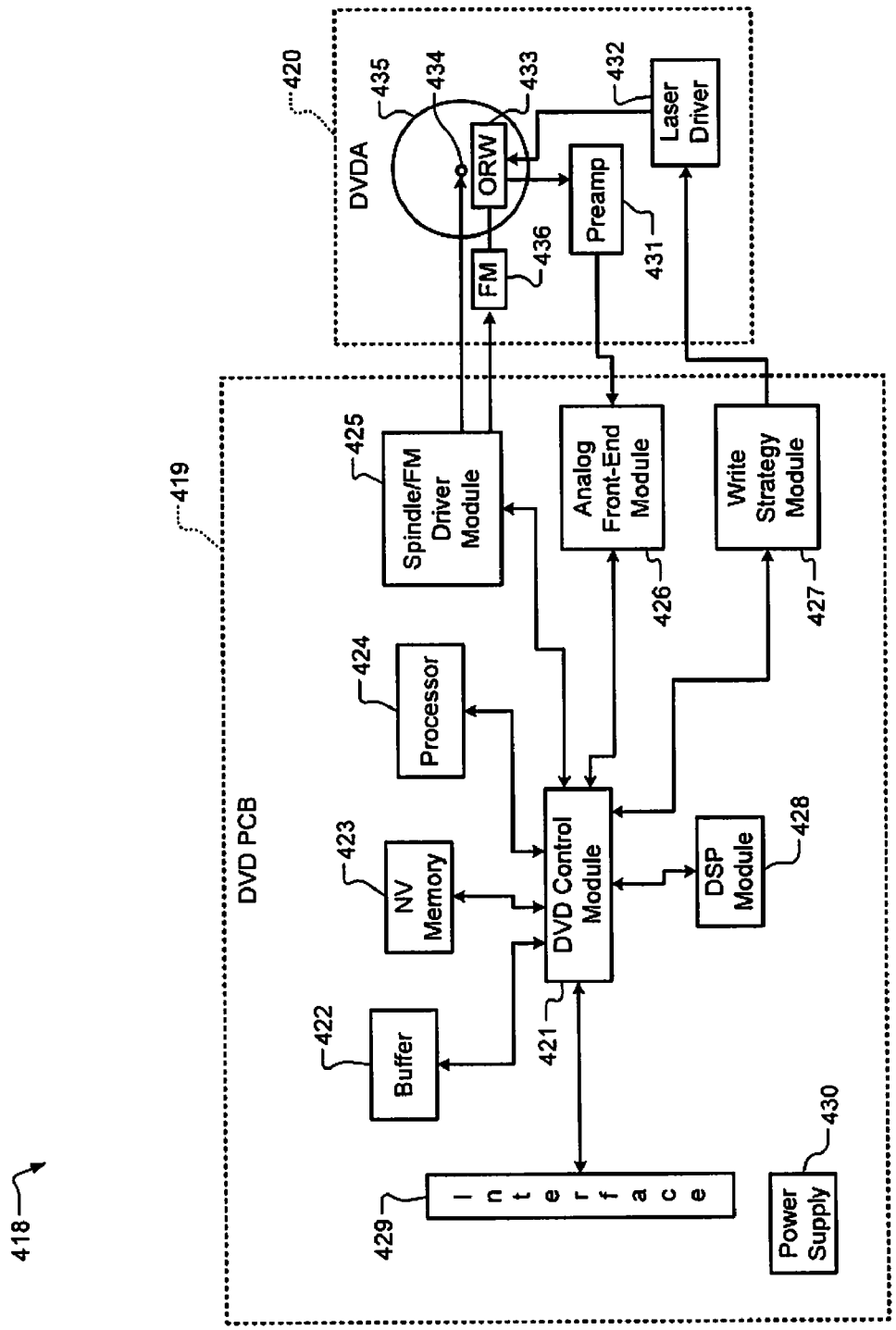
FIG. 6B is a functional block diagram of a DVD drive.

Referring now to FIG. 6B, the teachings of the disclosure can be implemented in a DVD control module to selectively control clocking operations for any or all dynamic logic based components of a DVD drive 418 or of a CD drive (not shown). The DVD drive 418 includes a DVD PCB 419 and a DVD assembly (DVDA) 420. The DVD PCB 419 includes the DVD control module 421, a buffer 422, nonvolatile memory 423, a processor 424, a spindle/FM (feed motor) driver module 425, an analog front-end module 426, a write strategy module 427, and a DSP module 428.

The DVD control module 421 controls components of the DVDA 420 and communicates with an external device (not shown) via an I/O interface 429. The external device may include a computer, a multimedia device, a mobile computing device, etc. The I/O interface 429 may include wireline and/or wireless communication links.

The DVD control module 421 may receive data from the buffer 422, nonvolatile memory 423, the processor 424, the spindle/FM driver module 425, the analog front-end module 426, the write strategy module 427, the DSP module 428, and/or the I/O interface 429. The processor 424 may process the data, including encoding, decoding, filtering, and/or formatting. The DSP module 428 performs signal processing, such as video and/or audio coding/decoding. The processed data may be output to the buffer 422, nonvolatile memory 423, the processor 424, the spindle/FM driver module 425, the analog front-end module 426, the write strategy module 427, the DSP module 428, and/or the I/O interface 429.

The DVD control module 421 may use the buffer 422 and/or nonvolatile memory 423 to store data related to the control and operation of the DVD drive 418. The buffer 422 may include DRAM, SDRAM, etc. Nonvolatile memory 423 may include any suitable type of semiconductor or solid-state memory, such as flash memory (including NAND and NOR flash memory), phase change memory, magnetic RAM, and multi-state memory, in which each memory cell has more than two states. The DVD PCB 419 includes a power supply 430 that provides power to the components of the DVD drive 418.

The DVDA 420 may include a preamplifier device 431, a laser driver 432, and an optical device 433, which may be an optical read/write (ORW) device or an optical read-only (OR) device. A spindle motor 434 rotates an optical storage medium 435, and a feed motor 436 actuates the optical device 433 relative to the optical storage medium 435.

When reading data from the optical storage medium 435, the laser driver provides a read power to the optical device 433. The optical device 433 detects data from the optical storage medium 435, and transmits the data to the preamplifier device 431. The analog front-end module 426 receives data from the preamplifier device 431 and performs such functions as filtering and A/D conversion. To write to the optical storage medium 435, the write strategy module 427 transmits power level and timing data to the laser driver 432. The laser driver 432 controls the optical device 433 to write data to the optical storage medium 435.

Figure 6D:
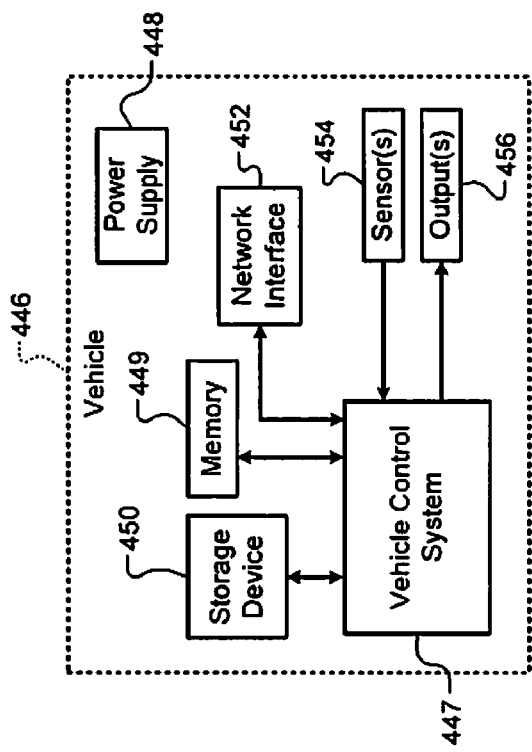
FIG. 6D is a functional block diagram of a vehicle control system.
Figure 6C:
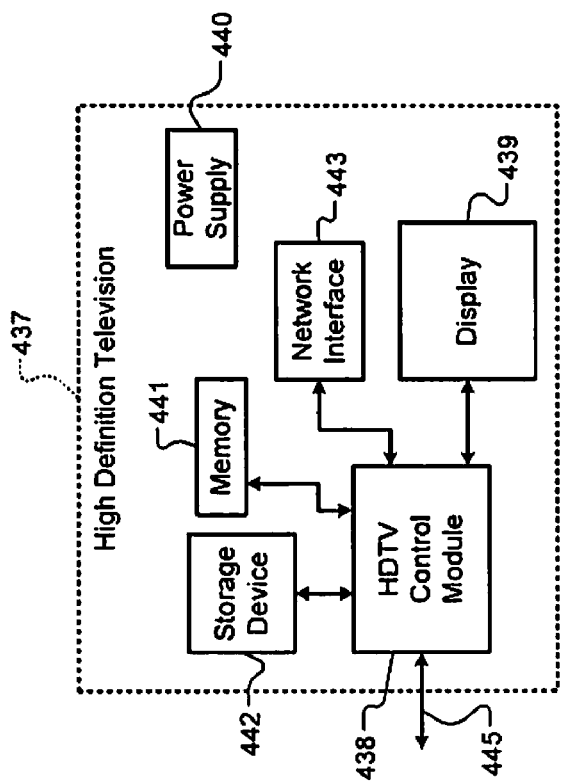
FIG. 6C is a functional block diagram of a high definition television.

Referring now to FIG. 6C, the teachings of the disclosure can be implemented in a high definition television (HDTV) control module of a HDTV 437 to selectively control clocking operations for any or all dynamic logic based components of the HDTV 437. The HDTV 437 includes the HDTV control module 438, a display 439, a power supply 440, memory 441, a storage device 442, a network interface 443, and an external interface 445. If the network interface 443 includes a wireless local area network interface, an antenna (not shown) may be included.

The HDTV 437 can receive input signals from the network interface 443 and/or the external interface 445, which can send and receive data via cable, broadband Internet, and/or satellite. The HDTV control module 438 may process the input signals, including encoding, decoding, filtering, and/or formatting, and generate output signals. The output signals may be communicated to one or more of the display 439, memory 441, the storage device 442, the network interface 443, and the external interface 445.

Memory 441 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 442 may include an optical storage drive, such as a DVD drive, and/or a hard disk drive (HDD). The HDTV control module 438 communicates externally via the network interface 443 and/or the external interface 445. The power supply 440 provides power to the components of the HDTV 437.

Referring now to FIG. 6D, the teachings of the disclosure may be implemented in a control system of a vehicle 446 to selectively control clocking operations for any or all dynamic logic based components of the vehicle 446. The vehicle 446 may include the vehicle control system 447, a power supply 448, memory 449, a storage device 450, and a network interface 452. If the network interface 452 includes a wireless local area network interface, an antenna (not shown) may be included. The vehicle control system 447 may be a powertrain control system, a body control system, an entertainment control system, an anti-lock braking system (ABS), a navigation system, a telematics system, a lane departure system, an adaptive cruise control system, etc.

The vehicle control system 447 may communicate with one or more sensors 454 and generate one or more output signals 456. The sensors 454 may include temperature sensors, acceleration sensors, pressure sensors, rotational sensors, airflow sensors, etc. The output signals 456 may control engine operating parameters, transmission operating parameters, suspension parameters, etc.

The power supply 448 provides power to the components of the vehicle 446. The vehicle control system 447 may store data in memory 449 and/or the storage device 450. Memory 449 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 450 may include an optical storage drive, such as a DVD drive, and/or a hard disk drive (HDD). The vehicle control system 447 may communicate externally using the network interface 452.

Figure 6F:
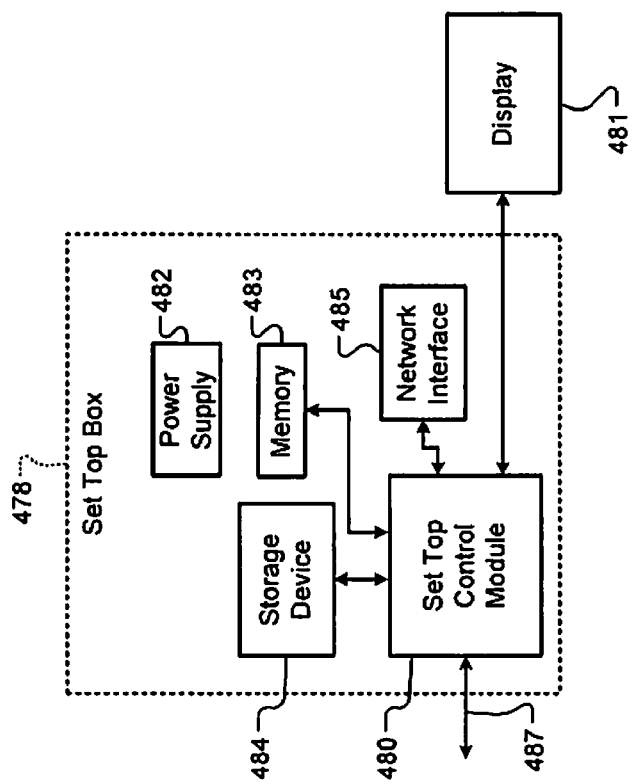
FIG. 6F is a functional block diagram of a set top box.
Figure 6E:
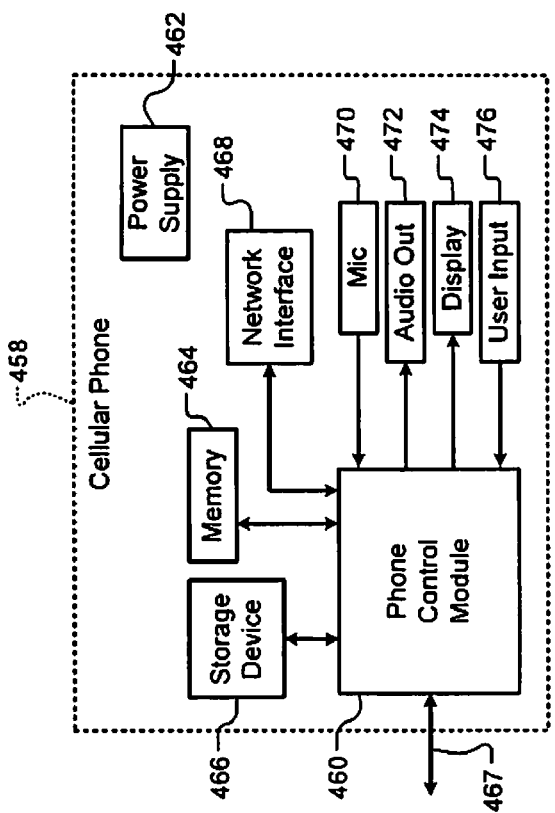
FIG. 6E is a functional block diagram of a cellular phone.

Referring now to FIG. 6E, the teachings of the disclosure can be implemented in a phone control module of a cellular phone 458 to selectively control clocking operations for any or all dynamic logic based components of the cellular phone 458. The cellular phone 458 includes the phone control module 460, a power supply 462, memory 464, a storage device 466, and a cellular network interface 467. The cellular phone 458 may include a network interface 468, a microphone 470, an audio output 472 such as a speaker and/or output jack, a display 474, and a user input device 476 such as a keypad and/or pointing device. If the network interface 468 includes a wireless local area network interface, an antenna (not shown) may be included.

The phone control module 460 may receive input signals from the cellular network interface 467, the network interface 468, the microphone 470, and/or the user input device 476. The phone control module 460 may process signals, including encoding, decoding, filtering, and/or formatting, and generate output signals. The output signals may be communicated to one or more of memory 464, the storage device 466, the cellular network interface 467, the network interface 468, and the audio output 472.

Memory 464 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 466 may include an optical storage drive, such as a DVD drive, and/or a hard disk drive (HDD). The power supply 462 provides power to the components of the cellular phone 458.

Referring now to FIG. 6F, the teachings of the disclosure can be implemented in a set top control module of a set top box 478 to selectively control clocking operations for any or all dynamic logic based components of the set top box 478. The set top box 478 includes the set top control module 480, a display 481, a power supply 482, memory 483, a storage device 484, and a network interface 485. If the network interface 485 includes a wireless local area network interface, an antenna (not shown) may be included.

The set top control module 480 may receive input signals from the network interface 485 and an external interface 487, which can send and receive data via cable, broadband Internet, and/or satellite. The set top control module 480 may process signals, including encoding, decoding, filtering, and/or formatting, and generate output signals. The output signals may include audio and/or video signals in standard and/or high definition formats. The output signals may be communicated to the network interface 485 and/or to the display 481. The display 481 may include a television, a projector, and/or a monitor.

The power supply 482 provides power to the components of the set top box 478. Memory 483 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 484 may include an optical storage drive, such as a DVD drive, and/or a hard disk drive (HDD).

Figure 6G:
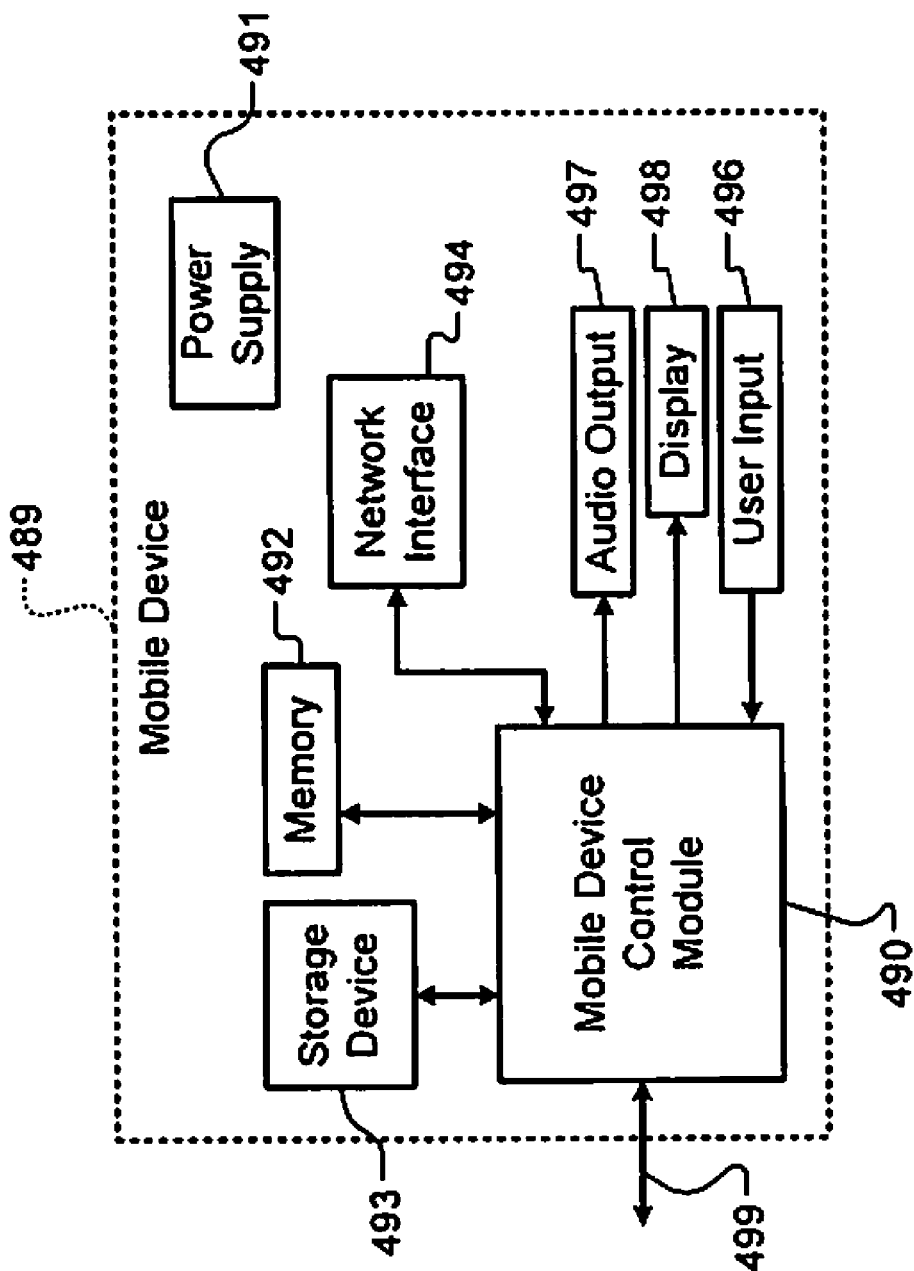
FIG. 6G is a functional block diagram of a mobile device.

Referring now to FIG. 6G, the teachings of the disclosure can be implemented in a mobile device control module of a mobile device 489 to selectively control clocking operations for any or all dynamic logic based components of the mobile device. The mobile device 489 may include the mobile device control module 490, a power supply 491, memory 492, a storage device 493, a network interface 494, and an external interface 499. If the network interface 494 includes a wireless local area network interface, an antenna (not shown) may be included.

The mobile device control module 490 may receive input signals from the network interface 494 and/or the external interface 499. The external interface 499 may include USB, infrared, and/or Ethernet. The input signals may include compressed audio and/or video, and may be compliant with the MP3 format. Additionally, the mobile device control module 490 may receive input from a user input 496 such as a keypad, touchpad, or individual buttons. The mobile device control module 490 may process input signals, including encoding, decoding, filtering, and/or formatting, and generate output signals.

The mobile device control module 490 may output audio signals to an audio output 497 and video signals to a display 498. The audio output 497 may include a speaker and/or an output jack. The display 498 may present a graphical user interface, which may include menus, icons, etc. The power supply 491 provides power to the components of the mobile device 489. Memory 492 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 493 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A clock gater, comprising:
a first logic circuit that receives an enable signal and that comprises first and second subcircuits; and
a latch that shares first and second nodes with said first logic circuit and that comprises third and fourth subcircuits, wherein said first logic circuit and said latch receive a clock signal that varies between first and second clock states,
wherein said first and third subcircuits pull said first and second nodes, respectively, to a common precharge voltage based on said first clock state to pass said clock signal, and wherein said second and fourth subcircuits pull said first and second nodes, respectively, to complementary voltages based on said second clock state to pass said clock signal,
wherein said first node passes said clock signal and gates said clock signal based on said enable signal.

2. The clock gater of claim 1 wherein said first logic circuit comprises a dynamic logic gate that comprises said first and second subcircuits.

3. The clock gater of claim 1 wherein said first logic circuit receives a test enable signal, wherein said first node passes said clock signal and gates said clock signal based on said test enable signal.

4. The clock gater of claim 1 wherein said first, second, third, and fourth subcircuits comprise at least one of n- and p-type transistors.

5. The clock gater of claim 1 wherein said latch comprises an inverter subcircuit, and wherein said first node passes and gates said clock signal via said inverter subcircuit, wherein said inverter subcircuit passes said clock signal by inverting a node voltage of said first node to provide an inverted voltage to an external system device without directly providing said node voltage to said external system device.

6. The clock gater of claim 5 wherein said inverter subcircuit comprises complimentary n- and p-type transistors that communicate with a reference voltage and a source voltage respectively.

7. The clock gater of claim 1 wherein said latch comprises a dynamic logic gate subcircuit that comprises said third and fourth subcircuits.

8. The clock gater of claim 7 wherein said third and fourth subcircuits comprise complimentary p- and n-type transistors, respectively, that communicate with a source voltage and a reference voltage, respectively, wherein both said complimentary p- and n-type transistors receive said clock signal.

9. The clock gater of claim 1 further comprising a keeper subcircuit that pulls said first node to a source voltage based on a voltage of said second node.

10. The clock gater of claim 9 wherein said keeper subcircuit comprises a p-type transistor that includes a first terminal that communicates with said source voltage, a second terminal that communicates with said first node and a control terminal that communicates with said second node, wherein said voltage of said second node corresponds to a threshold voltage of said control terminal.

11. The clock gater of claim 1 further comprising a feedback subcircuit that pulls said second node to a first voltage based on said first node at a second voltage and said first clock state.

12. The clock gater of claim 11 wherein said feedback subcircuit comprises an inverter and an n-type transistor that includes a first terminal that communicates with said first node, a second terminal that communicates with a reference voltage via said second subcircuit without directly communicating with said second node before communicating with said second subcircuit, and a control terminal that receives an inverted voltage of said first node via said inverter.

13. An integrated circuit (IC) that comprises the clock gater of claim 1 and further comprises:
a clock source that provides said clock signal.

14. A method for operating a clock gater, comprising:
receiving an enable signal in a first logic circuit;
sharing first and second nodes between said first logic circuit and a latch;
receiving a clock signal that varies between first and second clock states in said first logic circuit and said latch;
pulling said first and second nodes, respectively, to a common precharge voltage based on said first clock state to pass said clock signal;
pulling said first and second nodes, respectively, to complementary voltages based on said second clock state to pass said clock signal; and
passing and gating said clock signal based on said enable signal.

15. The method of claim 14 wherein said first logic circuit comprises a dynamic logic gate.

16. The method of claim 14 further comprising:
receiving a test enable signal wherein said first logic circuit; and
passing said clock signal in response to said test enable signal.

17. The method of claim 14 further comprising:
receiving a test enable signal wherein said first logic circuit; and
gating said clock signal in response to said test enable signal.

18. The method of claim 14 wherein said first and second logic circuits comprise at least one of n- and p-type transistors.

19. The method of claim 14 further comprising passing and gating said clock signal via an inverter subcircuit of said latch.

20. The method of claim 19 further comprising connecting a reference voltage and a source voltage respectively to complimentary n- and p-type transistors of said inverter subcircuit.

21. The method of claim 14 wherein said latch comprises a logic gate subcircuit that comprises third and fourth subcircuits.

22. The method of claim 21 further comprising connecting complimentary p- and n-type transistors of said third and fourth subcircuits to a source voltage and a reference voltage, respectively.

23. The method of claim 14 further comprising pulling said first node to a source voltage based on a voltage of said second node.

24. The clock gater of claim 23 further comprising pulling said second node to first voltage based on said first node at a second voltage and said first clock state.

25. The clock gater of claim 24 wherein pulling said second node includes pulling said second node through a feedback subcircuit, wherein said feedback subcircuit comprises an inverter and an n-type transistor that includes a first terminal communicating with said first node, a second terminal communicating with a reference voltage, and a control terminal receiving an inverted voltage of said first node via said inverter.

26. A clock gater, comprising:
first logic means for receiving an enable signal, said first logic means comprises first and second submeans for responding to a clock signal; and
latch means for sharing first and second nodes with said first logic means, said latch means comprises third and fourth submeans for responding to said clock signal, wherein said first logic means and said latch means receive said clock signal that varies between first and second clock states,
wherein said first and third submeans pull said first and second nodes, respectively, to a common precharge voltage based on said first clock state to pass said clock signal, and wherein said second and fourth submeans pull said first and second nodes, respectively, to complementary voltages based on said second clock state to pass said clock signal,
wherein said first node passes said clock signal and gates said clock signal based on said enable signal.

27. The clock gater of claim 26 wherein said first logic means comprises a dynamic logic gate that comprises said first and second submeans.

28. The clock gater of claim 26 wherein said first logic means receives a test enable signal, wherein said first node passes said clock signal and gates said clock signal based on said test enable signal.

29. The clock gater of claim 26 wherein said first, second, third, and fourth submeans comprise at least one of n- and p-type transistors.

30. The clock gater of claim 26 wherein said latch means comprises inverter submeans for inverting, and wherein said first node passes and gates said clock signal via said inverter submeans.

31. The clock gater of claim 30 wherein said inverter submeans comprises complimentary n- and p-type transistor means for communicating with a reference voltage and a source voltage respectively.

32. The clock gater of claim 26 wherein said latch means comprises a dynamic logic gate that comprises said third and fourth submeans.

33. The clock gater of claim 32 wherein said third and fourth submeans comprise complimentary p- and n-type transistor means, respectively, for communicating with a source voltage and a reference voltage, respectively.

34. The clock gater of claim 26 further comprising keeper submeans for pulling said first node to a source voltage based on a voltage of said second node.

35. The clock gater of claim 34 wherein said keeper submeans comprises p-type transistor means for switching that includes first terminal means for communicating with said source voltage, second terminal means for communicating with said first node and control terminal means for communicating with said second node, wherein said voltage of said second node corresponds to a threshold voltage of said control means.

36. The clock gater of claim 26 further comprising feedback submeans for pulling said second node to a first voltage based on said first node at a second voltage and said first clock state.

37. The clock gater of claim 36 wherein said feedback submeans comprises inverter means for inverting and n-type transistor means for switching that includes first terminal means for communicating with said first node, second terminal means for communicating with a reference voltage, and control terminal means for receiving an inverted voltage of said first node via said inverter means.

38. An integrated circuit (IC) that comprises the clock gater of claim 26 and further comprises:
clock means for providing said clock signal.

* * * * *